(12) United States Patent
Bisti et al.

(10) Patent No.: US 8,320,676 B2
(45) Date of Patent: Nov. 27, 2012

(54) METHOD FOR CONFIGURING CAMERA-EQUIPPED ELECTRONIC DEVICES USING AN ENCODED MARK

(75) Inventors: Jeffrey E. Bisti, New Paltz, NY (US); Eli M. Dow, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 12/023,371

(22) Filed: Jan. 31, 2008

(65) Prior Publication Data

US 2009/0196456 A1    Aug. 6, 2009

(51) Int. Cl.
*G06K 9/00* (2006.01)

(52) U.S. Cl. ........ 382/181; 382/182; 382/100; 382/190; 382/198; 382/232; 348/143; 348/150; 348/157

(58) Field of Classification Search .................. 382/181, 382/182, 100, 190, 198, 232; 348/143, 150, 348/157
See application file for complete search history.

(56) References Cited

U.S. PATENT DOCUMENTS

| | | | |
|---|---|---|---|
| 6,223,190 B1 | 4/2001 | Aihara et al. .................. 707/513 |
| 6,917,724 B2 | 7/2005 | Seder et al. .................... 382/321 |
| 7,197,531 B2 | 3/2007 | Anderson ..................... 709/203 |
| 7,209,571 B2 | 4/2007 | Davis et al. ................... 382/100 |
| 7,570,781 B2 * | 8/2009 | Rhoads et al. ................ 382/100 |
| 2006/0120606 A1 | 6/2006 | Furahashi et al. ............ 382/190 |
| 2006/0132639 A1 * | 6/2006 | Page ............................ 348/335 |
| 2007/0071322 A1 * | 3/2007 | Maltagliati et al. .......... 382/181 |

* cited by examiner

*Primary Examiner* — Mike Rahmjoo
(74) *Attorney, Agent, or Firm* — Dennis Jung, Esq.; Kevin P. Radigan, Esq.; Heslin Rothenberg Farley & Mesiti P.C.

(57) ABSTRACT

A wide range of digital devices either have or are provided with imaging devices which are capable of imaging externally provided information in the form of special codes that contain setup and/or configuration information. Processors within these devices, which include cell phones, cameras, PDAs and personal computers, to name just a few, recognize the image and convert it to the desired configuration and/or setup information.

20 Claims, 6 Drawing Sheets

We recommend that before using your camera, you enter a password to protect your camera from unauthorized access attempts.

Your may do this by taking a picture of the rectangle below and holding down the exposure button until you see a flashing green light.

You will then be asked to confirm the new password by pressing the up arrow

The above encoded image will preset your camera with the password:

FEA26MON

You may wish to place this document in a safe place in case you need to reset it later

Fig. 1

METHOD FOR CONFIGURING CAMERA-EQUIPPED ELECTRONIC DEVICES USING AN ENCODED MARK

TECHNICAL FIELD

The present invention is generally directed to digital devices which are provided with an improved mechanism for setup. More particularly, the present invention is directed to a wide range of digital devices which include imaging devices such as cameras, gaming systems, computers, PDAs, processors and the like which together operate to provide setup information in a visually encoded format. Even more particularly, the present invention is directed to a system and method for ensuring greater security in device set up and operation.

BACKGROUND OF THE INVENTION

In order for a user to configure some digital life devices (cell phones, digital cameras, portable gaming device, satellite radios, GPS devices, etc.), they are required to enter some amount of information into the device such as geographic location, personal user registration, or wireless network information. This can be accomplished by the use of an emulated keyboard or some other method of character selection, or in the case of many wireless devices, by way of automatic detection and communication (Wi-Fi and Bluetooth).

Many users do not know how to configure their own devices. Often times, if the device works well enough with the default settings, a user will leave these default settings unchanged because they do not want to go through the pains of a complicated configuration procedure. It is thus much more likely that a hacker will find it easy to obtain a list of default passwords for common digital devices on the Internet, which they can then use to wrongfully obtain access to such an unprotected device.

The CueCat (a device once offered by Radio Shack) was a barcode scanning device disposed between a user's keyboard and their PC to convert barcodes into character strings that were recognized by provided software to direct the user to an advertiser's web site. This device is not likely to advance past its current stages, where it requires the user to place the cursor into the appropriate text entry field and then let the CueCat "type" out the password. It is meant as a method of automating the password entry and tracking process for the PC (Personal Computer) user, and does not extend to peripherals, nor does it involve any sort of automatic configuration.

ShotCode is a company that takes a company's website and turns it into a special kind of readable mark, almost like the ones that one sees on UPS labels. The idea is that a user will see an ad at a bus stop or elsewhere and focus their camera on this readable barcode-type mark, and their handheld device will take them to the advertiser's website. This is the only function that their method provides, namely, the encoding of a URL that the user is then led to. Shotcode's system, while being more intelligent than CueCat, is just another method of bypassing the process of typing out a long URL for a website, used primarily for advertising. There is no processing of the data that is being decoded beyond simply extracting the characters that form the URL, whereas the present invention includes a set of instructions that are processed and executed by the digital device. Additionally, the Shotcode system does not extend as far as the system proposed herein, which is specifically designed to provide automated device configuration.

From the above, it is therefore seen that there exists a need in the art to overcome the deficiencies and limitations described herein and above.

SUMMARY OF THE INVENTION

In accordance with one embodiment of the present invention, a digital device is provided with a facilitated setup feature comprising; an imaging device; a processor which controls the device and which also receives image information from the imaging device; and a memory, for holding data and instructions, coupled to the processor. The memory includes instructions for recognizing images presented to the imaging device and for converting these images to desired setup information for the device.

The present invention also provides a process that makes use of the camera built into many modern digital devices to read or interpret an image, either displayed on a monitor or printed on a piece of paper. The image contains a specially encoded mark that is interpreted by the device and converted into a small amount of data that is especially useful for device setup and even more especially in a manner which provides both ease and security functionality. Upon capturing a picture of a special mark, the device alerts the user that it has found some data that it can use, and is typically configured to prompt the user to either apply or to ignore the data.

This not only provides the user with a much simpler method of entering strings of data, but ensures that any communication taking place occurs in a manner that cannot be intercepted merely by being within wireless range or by obtaining a list of commonly used passwords.

For example, consumer-grade digital cameras are equipped with wireless technology that allows them to connect to local Wi-Fi networks for easy downloading of pictures. A device that participates on any sort of network, be it wired or wireless, is susceptible to attack. A user can protect his or her data by using an encrypted network so that no unauthorized users can intercept data, and by setting a password on their camera (or other digital device), which protects unauthorized users from connecting to the device if it is being used on an unencrypted or compromised network. The passwords and various other settings for this type of protection typically have to be manually entered by the user, which has been identified above as being cumbersome and awkward to the user. By allowing the user the flexibility to enter this information visually, it not only saves the user time, but the close-range nature of the configuration eliminates the possibility that an unauthorized user is listening in from outside. In accordance with the present invention, a vendor of such digital cameras includes a separate piece of paper with the camera that comes with a randomly generated password and corresponding encoded mark that the user can refer back to if he or she ever needs to reset the device back to a known password. A user is also able to create his or her own printable document that can be filed in a safe place and which can be used at a future time to reconfigure the camera (or other device) to a "good" setting in case anything goes wrong and they do not know how to fix the settings.

This interaction is not only used for one-time setup in simple devices that simply need a good password (wireless phones, PDAs, digital cameras, GPS devices, satellite radio receivers), but also as an easy method of configuring more complex and networked devices such as Wi-Fi enabled digital cameras, smart phones, and portable gaming systems. Currently, in order for a user to configure his or her portable gaming system for use with/on an encrypted network, the user has to enter in the network information by hand. It is a great advantage to that user, if they are instead, they are able to have their device read an encoded image that is either: (1) displayed on a monitor; (2) generated from network information that is programmed into their own wireless router; or (3) provided by the device supplier via an enclosed printed image. The monitor display is providable either from an Internet site or is generated using supplied software. This simplifies a process that otherwise require the typing of up to 30 characters, or even more. To many users, this process is the hurdle that makes wireless security difficult to the point where they would rather risk vulnerability just to make their devices work.

It is useful to note that in the present invention the image being captured is provided either electronically (from a computer's monitor) or from a printed medium, and that the data which is extracted from the image is preferably not necessarily in the form of readily-executable program instructions, but rather in the form of a pseudocode representation of the proposed set up/configuration (for example, "ssid:crystalnet password:0a8af9a9a98a8") which is then translated into a machine-readable format. Changes in the configuration are stored in nonvolatile memory, similar to the settings on a wireless phone.

Additional features and advantages are realized through the techniques of the present invention. Other embodiments and aspects of the invention are described in detail herein and are considered a part of the claimed invention.

The recitation herein of any desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1 is an example of a document that is able to configure a device, in this case, a digital camera;

DETAILED DESCRIPTION

This invention is based upon the idea that users often times do not configure their devices because they either do not know how to or do not want to inconvenience themselves with a device's interface. It requires that a digital device has a device for capturing images, a program for recognizing, decoding, and applying instructions found in specially coded marks, and a method for creating a machine-readable encoded mark quickly and reliably.

FIG. 1 illustrates an exemplary card that is provided, for example, by a camera manufacturer as a mechanism for configuring a newly purchased camera with an appropriate password. As indicated the password provides a mechanism to prevent unauthorized access. The card shown is displayed in front of the camera lens and a picture is taken of the small rectangle shown which illustrates a two-dimensional barcode. The card provided contains instructions for the user as to how to use the card in conjunction with the camera. The processor in the camera converts the specially coded information in the image (whether it be a bar code or other symbology) into information which is decoded as configuration or setup data. As indicated in FIG. 1, the user is advised to keep the document/card in a safe place in the event that the device needs to be reset. The configuration information provided typically includes such things as passwords, default settings, user IDs and time and date stamps.

Figure 2:
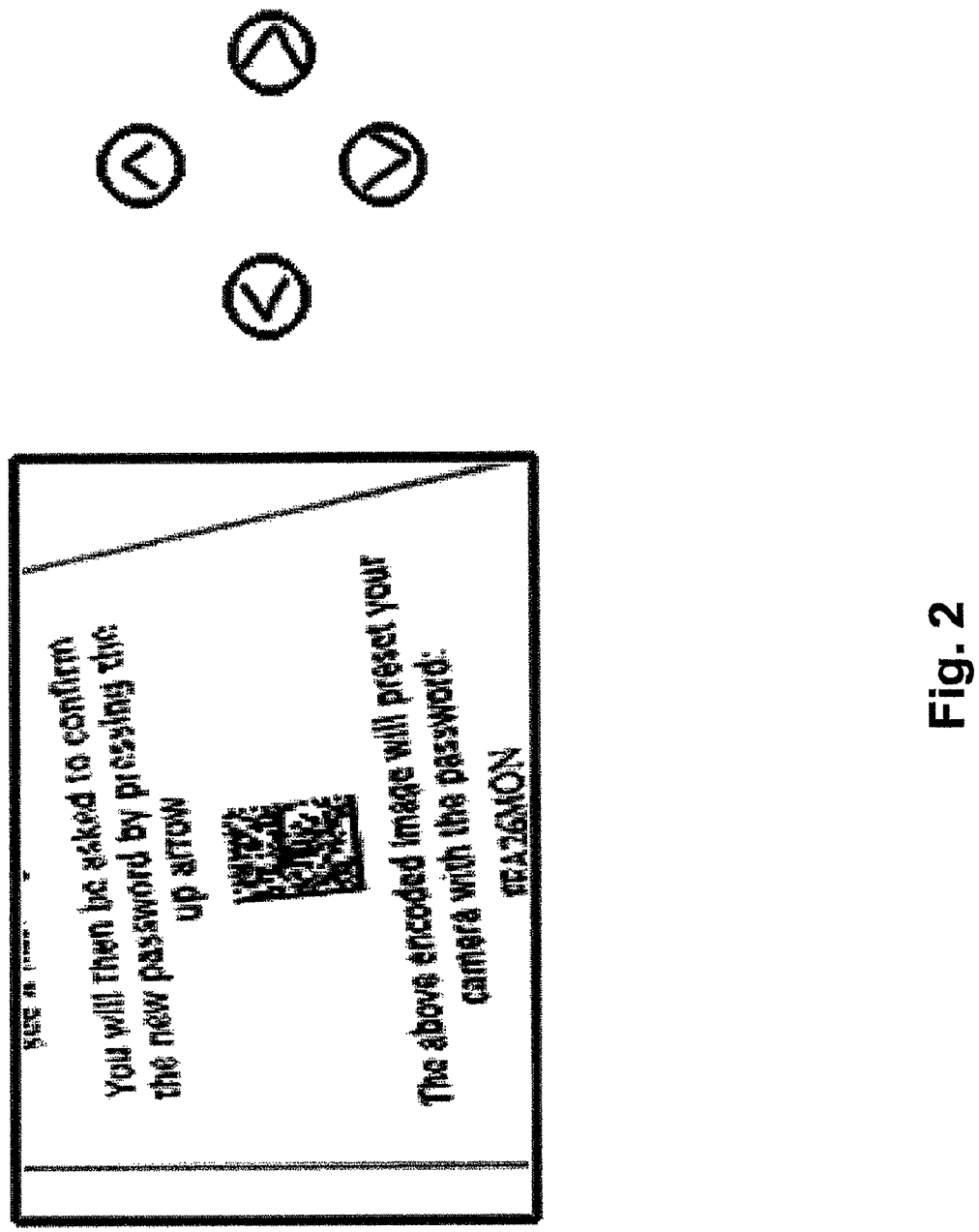
FIG. 2 is an example of the document from FIG. 1 as it is being photographed by a camera.

FIG. 2 provides an illustration of how the device views the card presented. In particular, the skewed angle of the view illustrates the fact that image processing software within the device may sometimes have to take account of the viewing angle in order to ensure proper reading. FIG. 2 also illustrates the presence of arrows that are provided for user input during the configuration process. These arrows represent the buttons which are present either as separate switches or as areas on a touch screen display.

Figure 3:
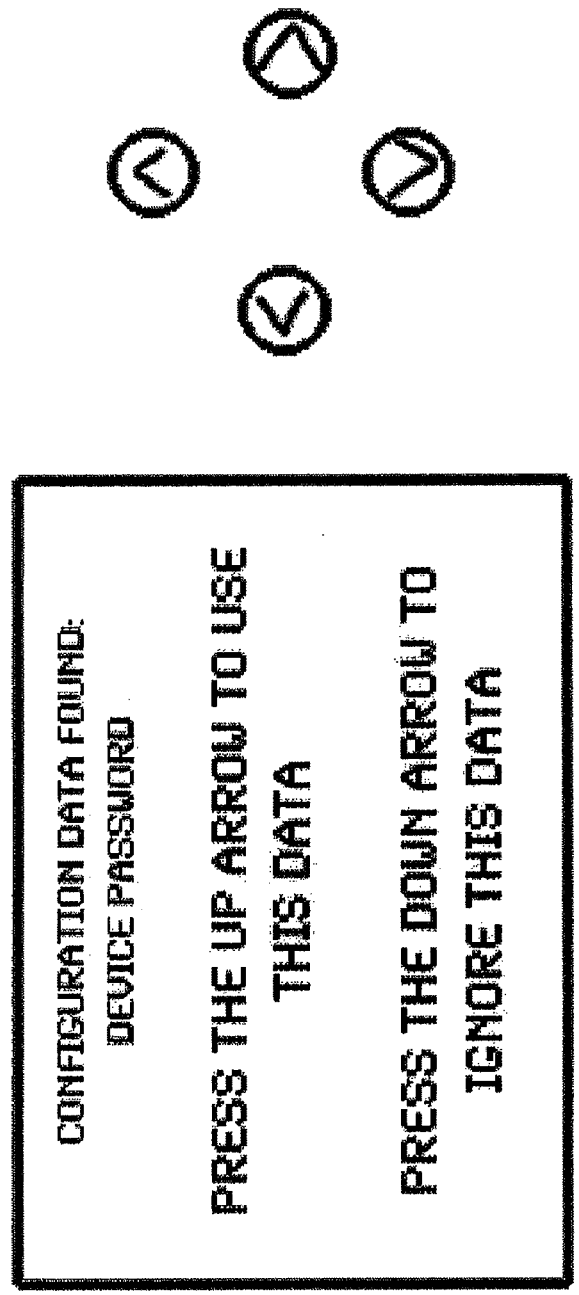
FIG. 3 is an image of an exemplary message that is presented to a user after relevant information has been pulled from an encoded mark and more particularly illustrating options that are available to the user.

FIG. 3 provides an illustration of a message that is returned to a user subsequent to a reading of the card provided. In this particular instance the message indicates that the device was found a configuration password. The user is then given that the opportunity of accepting this as the appropriate data input more ignoring the data.

Figure 4:
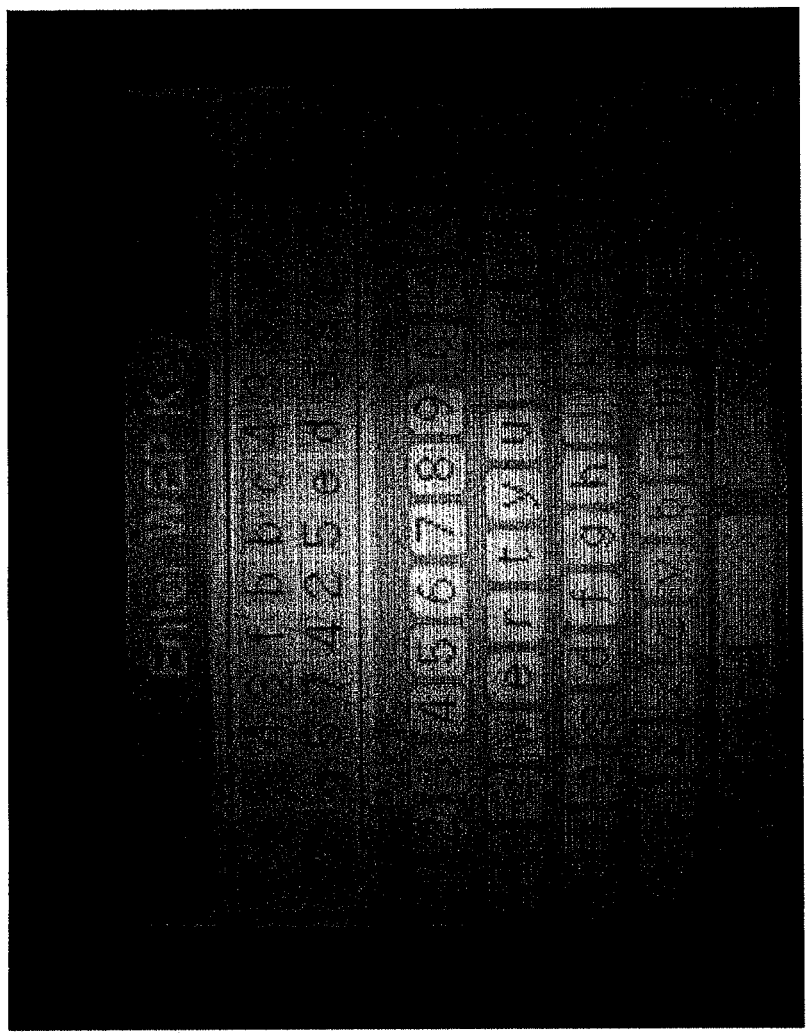
FIG. 4 is a screenshot of a Nintendo DS gaming system's Wi-Fi configuration screen which illustrates the fact that even though a user is provided with a simulated keyboard on a touch screen, which is much easier than using up and down arrow keys like on a camera, configuration is still bothersome and confusing.

FIG. 4 illustrates a touch screen display which simulates a keyboard input. In a particular instance shown the keyboard is being used to enter a web encryption protocol key used for encryption. FIG. 4 particularly illustrates the case in which the required key is 32 characters in length. Even more particularly, FIG. 4 illustrates the situation in which the last simulated key representing the numeral "1" is being supplied to the device. As can be seen the entry of such lengthy strings of information is both time-consuming and error-prone to the point of being so annoying as to discourage users from employing desirable provided security features.

Figure 5:
FIG. 5 is an example of a screen from an Internet browser where a camera enabled device is able to quickly configure itself based on an encoded mark, rather than by typing in the network name, channel ID, encryption type and encryption ID.

FIG. 5 illustrates yet another form of card and/or document that is provided with a digital device capable of employing the features of the present invention. In this particular example the information provided indicates network configuration and encryption settings to be employed with a wireless device such as a laptop computer. The fast configuration image is illustrated at the bottom of the figure.

Figure 6:
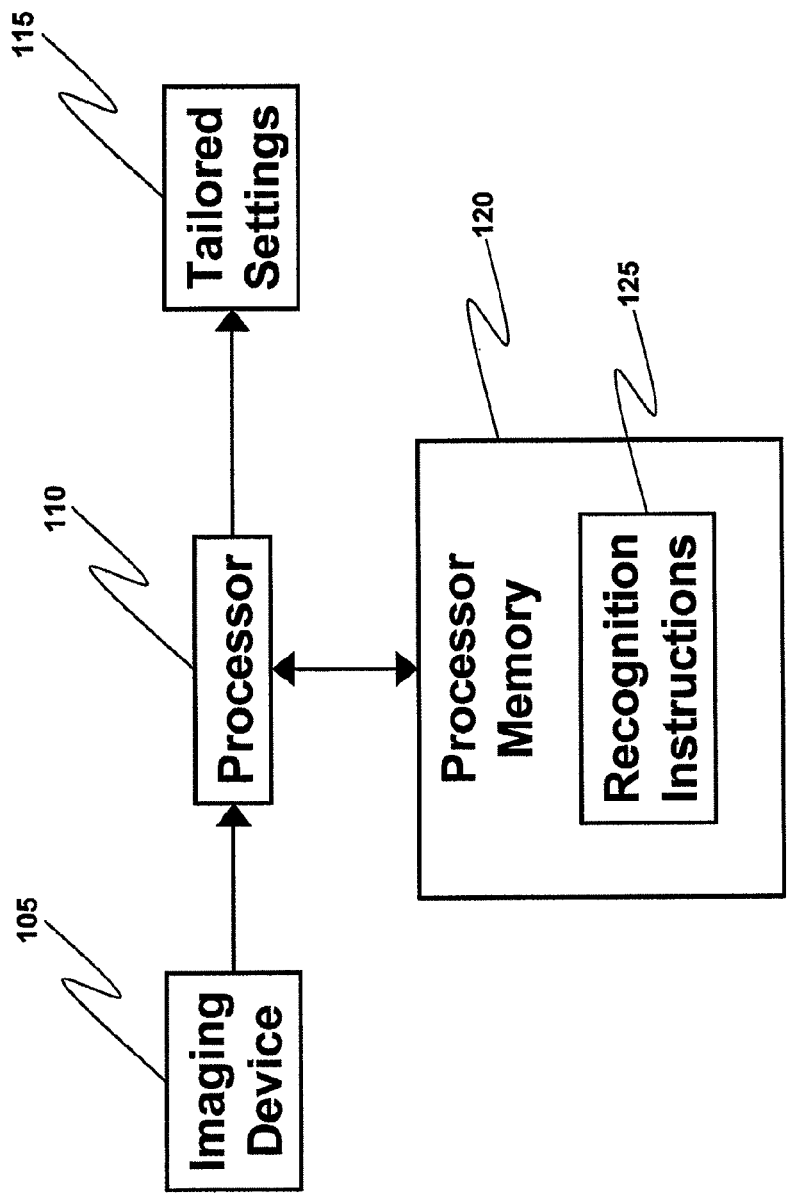
FIG. 6 is a block diagram illustrating the structure of digital devices in which the features of the present invention are embodied.

FIG. 6 illustrates, in an overall block diagram form, the structure and connections present in the devices employing the present invention. In particular, the digital device either already includes or is provided with imaging device 105. This device, typically in the form of a digital camera such as those found in cell phones or web cameras, is employed to capture an image of printed material provided by the manufacturer with the device. Imaging device 105 provides a single representative of the image to processor 110. Digital devices of the kind contemplated as benefiting from the feature set of the present invention include processors such as processor 110.

Processor 110 is coupled to memory or storage 120 which includes program instructions 125 therein for recognizing document image data and for converting it to configuration information for the device. The configuration or setup information is stored in a permanent or closet permanent form in tailored settings memory 115 which typically comprises a specially allocated portion of processor memory 120.

It is also noted that in addition to providing configuration data in the form of printed material a device supplier or manufacturer may also supply the desired visual information in the form of an indicated linkage to an Internet website where the images displayed on a monitor. It is furthermore noted that configuration data may also be provided to an end user in the form of a file stored on a disk (magnetic or optical) which the end-user loads and prints out for optical scanning purposes.

Upon conversion of image information into the form of configuration or set up data, this data is typically stored in the memory normally used by the processor. However, in certain cases it is also desirable to store such converted data in a separate nonvolatile storage area.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A digital device comprising:
a setup feature facilitating setting up at least one user-configurable security credential of the digital device, the at least one user-configurable security credential comprising at least one of a stored password to protecting against unauthorized access to the digital device, or stored network configuration information used in encryption on an encrypted network, the setting up of the at least one user-configurable security credential configuring the digital device with the password, wherein the password protects against unauthorized access to the digital device, or with the network configuration information used in encryption on the encrypted network;
an imaging device;
a processor which controls said digital device and which receives image information from said imaging device; and
a memory for data and instructions coupled to said processor, said memory including instructions which:
recognize images presented to said imaging device;
convert said images to setup information for said digital device, the setup information facilitating setting up the at-least one user-configurable security credential of the digital device; and
using said setup information to setup the at least one user-configurable security credential of the digital device, the setup information specifying at least one credential, and the setting up the at least one user-configurable security credential applying the specified at least one credential as at least one of the stored password protecting against unauthorized access to the digital device, or the stored network configuration information used in encryption on the encrypted network.

2. The digital device of claim 1 in which said digital device is selected from the group consisting of cell phones, cameras, PDA's, GPS's, smart phones, personal laptop computers, personal desktop computers and gaming devices.

3. The digital device of claim 1 in which said digital device is connected to a network via a wireless connection.

4. The digital device of claim 1 in which said digital device is connected to a network via a wired connection.

5. The digital device of claim 1 in which a portion of said memory is allocated to storage of said setup information.

6. The digital device of claim 1 in which said setup information further specifies at least one of: default settings, a user name, a time stamp, or a date stamp for the digital device.

7. The digital device of claim 1 in which said image information is present in the form of printed media.

8. The digital device of claim 7 in which said printed media accompanies the digital device upon supply of the digital device by a supplier thereof to the user and further includes instructions for the user of the digital device.

9. The digital device of claim 1 in which said setup information is stored in said memory.

10. The digital device of claim 1 in which said setup information is stored in its own separate, non-volatile memory.

11. The digital device of claim 1 in which said setup information is in the form of pseudocode representation of at least one security credential of the at least one user-configurable security credential of the digital device, and wherein the instructions execute to translate the pseudocode representation into a device-readable format facilitating configuring the at least one user-configurable security credential of the digital device.

12. The digital device of claim 1, wherein the at least one user-configurable security credential comprises a user-specifiable data string configurable via manual entrance of a string of data by the user into the digital device.

13. A method comprising:
setting up at least one user-configurable security credential of a digital device, the at least one user-configurable security credential comprising at least one of a stored password protecting against unauthorized access to the digital device, or stored network configuration information used in encryption on an encrypted network, the setting up the at least one user-configurable security credential configuring the digital device with the password, wherein the password protects against unauthorized access to the digital device, or with the network configuration information used in encryption on the encrypted network, wherein the setting up the at least one user-configurable security credential comprises:
capturing an image and providing that image to a processor within the digital device in the form of an electrical signal representing the image;
converting said captured image to setup information facilitating setting up the at least one user-configurable security credential of the digital device; and
using said setup information by said digital device to setup the at least one user-configurable security credential of the digital device, the setup information specifying at least one credential, and the setting up the at least one user-configurable security credential applying the specified at least one credential as at least one of the stored password protecting against unauthorized access to the digital device, or the stored network configuration information used in encryption on the encrypted network.

14. The method of claim 13 in which said image is provided on a medium selected from the group consisting of a printed medium and a monitor screen.

15. The method of claim 14 in which said image comprises an encoded mark on the medium, and wherein the medium is further provided with instructions for the user as to how to use the encoded mark in setting up the at least one user-configurable security credential of the digital device, the encoded mark from which the setup information is converted being separate from the instructions for the user as to how to use the encoded mark.

16. The method of claim 13 in which said setup information is in the form of pseudocode representation of at least one security credential of the at least one user-configurable security credential of the digital device, and wherein the method further comprises translating the pseudocode representation into a device-readable format for facilitating configuring the at least one user-configurable security credential of the digital device.

17. The method of claim 13 in which said digital device is selected from the group consisting of cell phones, cameras, PDA's, GPS's, smart phones, personal laptop computers, personal desktop computers and gaming devices.

18. The method of claim 13 in which said setup information further specifies at least one of: default settings, a user name, a time stamp, or a date stamp for the digital device.

19. The method of claim 13 further including a preliminary step of producing said image, the producing comprising one of:
   providing, by a device supplier of the digital device, printed media on which the image is printed, the printed media accompanying the digital device upon supply of the digital device to the user by the device supplier; or
   creating, by the user, a document embodying the image.

20. A computer program product for configuring a digital device, the computer program product comprising:
   a non-transitory computer readable medium containing program instructions for performing a method comprising:
      setting up at least one user-configurable security credential of the digital device, the at least one user-configurable security credential comprising at least one of a stored password protecting against unauthorized access to the digital device, or stored network configuration information used in encryption on an encrypted network, the setting up the at least one user-configurable security credential configuring the digital device with the stored password, wherein the stored password protects against unauthorized access to the digital device, or with the stored network configuration information used in encryption on the encrypted network, wherein the setting up the at least one user-configurable security credential comprises:
      capturing an image and providing that image to a processor within the digital device in the form of an electrical signal representing the image;
      converting the captured image to setup information for facilitating setting up the at least one user-configurable security credential of the digital device; and
      using the setup information by the digital device to setup the at least one user-configurable security credential of the digital device, the setup information specifying at least one credential, and the setting up the at least one user-configurable security credential applying the specified at least one credential as at least one of the stored password protecting against unauthorized access to the digital device, or the stored network configuration information used in encryption on the encrypted network.

* * * * *